United States Patent
Wada et al.

(10) Patent No.: US 7,275,687 B2
(45) Date of Patent: Oct. 2, 2007

(54) SERVICE PROVIDING SYSTEM AND METHOD

(75) Inventors: Kenji Wada, Yokohama (JP); Chikashi Okamoto, Yokohama (JP); Yoshishige Narita, Higashikurume (JP); Naohisa Kobayashi, Kawasaki (JP); Masanori Ito, Matsudo (JP)

(73) Assignees: Hitachi, Ltd., Tokyo (JP); Hitachi High-Technologies Corporation, Tokyo (JP)

( * ) Notice: Subject to any disclaimer, the term of this patent is extended or adjusted under 35 U.S.C. 154(b) by 249 days.

(21) Appl. No.: 10/964,687

(22) Filed: Oct. 15, 2004

(65) Prior Publication Data
US 2005/0116030 A1    Jun. 2, 2005

(30) Foreign Application Priority Data
Nov. 28, 2003    (JP) .............................. 2003-399906

(51) Int. Cl.
*G06K 5/00*    (2006.01)
(52) U.S. Cl. ...................... 235/382; 235/381; 235/384
(58) Field of Classification Search ................ 235/382, 235/381, 375, 383, 384; 705/13
See application file for complete search history.

(56) References Cited
U.S. PATENT DOCUMENTS

| | | | |
|---|---|---|---|
| 5,740,369 A * | 4/1998 | Yokozawa et al. .......... 709/217 |
| 6,119,945 A * | 9/2000 | Muller et al. ................ 235/492 |
| 6,473,790 B1 * | 10/2002 | Tagi ............................ 709/216 |
| 6,587,835 B1 * | 7/2003 | Treyz et al. ................... 705/14 |
| 6,601,060 B1 * | 7/2003 | Tomaru ......................... 707/3 |
| 6,809,631 B2 * | 10/2004 | Doi et al. .................. 340/5.86 |
| 6,938,066 B1 * | 8/2005 | Doi ............................. 709/202 |
| 6,940,406 B2 * | 9/2005 | Sata ........................... 340/552 |
| 6,957,217 B2 * | 10/2005 | Raverdy et al. ............... 707/9 |
| 2002/0069127 A1 * | 6/2002 | Enari .......................... 705/26 |
| 2004/0256455 A1 * | 12/2004 | Fukushima et al. ......... 235/382 |

FOREIGN PATENT DOCUMENTS

JP    2002-074015    3/2002

* cited by examiner

*Primary Examiner*—Ahshik Kim
(74) *Attorney, Agent, or Firm*—Antonelli, Terry, Stout & Kraus, LLP.

(57) ABSTRACT

A delivery service providing system includes an entrance and exit control unit, an identifier control unit, and a delivery service providing unit. The entrance and exit control unit inputs a ticket identifier of a user who has entered or exited a predetermined area and transmits the identifier to the identifier control unit. The identifier control unit registers the ticket identifier to a database and erases the ticket in case of exit. The identifier control unit receives an identifier set of a ticket identifier and a user's unit identifier from a user's unit, checks to judge whether an identifier set matching the received identifier set in the database. If the result is positive, the delivery service providing unit delivers digital contents to the user's unit. It then becomes possible to provide only the users existing in the area with the contents deliver service.

15 Claims, 6 Drawing Sheets

FIG.3

| TICKET ID | UNIT ID | ENTRANCE DAY AND TIME | EXIT DAY AND TIME |
|---|---|---|---|
| 12480 (ERASED) | 192168003001 (ERASED) | 2003/09/11 10:45 | 2003/09/11 17:26 |
| 56291 (ERASED) | 171463258105 (ERASED) | 2003/09/11 18:27 | 2003/09/11 21:48 |
| 38754 | 133144108207 | 2003/09/12 15:39 | ENTERED |
| 84387 | NOT REGISTERED | 2003/09/12 16:08 | ENTERED |
| ⋮ | ⋮ | ⋮ | ⋮ |

| TICKET ID | UNIT ID | DELIVERY DAY AND TIME | CONTENTS ATTRIBUTE INFORMATION | CHARGED AMOUNT |
|---|---|---|---|---|
| 12480 | 192168003001 | 2003/09/11 12:38 | MOVIE (no.80) | 500 YEN |
| 12480 | 192168003001 | 2003/09/11 15:47 | INCOMING MELODY (no.41) | 30 YEN |
| 38754 | 133144108207 | 2003/09/12 17:26 | MUSIC PIECE (no.62) | 100 YEN |
| ⋮ | ⋮ | ⋮ | ⋮ | ⋮ |

THANK YOU VERY MUCH FOR YOUR VISIT!
THE AMOUNT IS 530 YEN.

DETAILS:
  CONTENTS DELIVERY SERVICE
    2003/09/11 12:38   MOVIE (no.80)                      500 YEN
    2003/09/11 15:47   INCOMING MELODY (no.41)   30 YEN

PLEASE, INSERT THE AMOUNT INTO THE SLOT BELOW THE SCREEN,
THANK YOU!

SERVICE PROVIDING SYSTEM AND METHOD

INCORPORATION BY REFERENCE

The present application claims priority from Japanese application JP2003-399906 filed on Nov. 28, 2003, the content of which is hereby incorporated by reference into this application.

BACKGROUND OF THE INVENTION

The present invention relates to a technique to provide services to users existing in a facility.

There has been proposed, for example, a service to deliver digital contents (to be simply referred to as contents hereinbelow) in a moving space such as a train. In this case, such contents are received in a radio signal receivable range or by establishing connection to a wired interface disposed in the moving space (reference is to be made to, for example, pages 4 to 6 and FIG. 1 of JP-A-2002-74015).

SUMMARY OF THE INVENTION

The technique described in JP-A-2002-74015 has a primarily objective to receive digital contents only in a moving space. However, it is favorable that the contents delivery service can also be received while the user is waiting for his or her train in station precincts. If contents are delivered by radio communication in the station precincts, it is desirable to provide the contents to those who use the facilities of the station or the passenger without clearly discriminating the station precincts from the external space of the station precincts for the following reason. The contents can be received at any positions outside the station, an amusement part, or the like only if radio waves can reach the positions.

It is therefore an object of the present invention to provide a contents delivery service only for users existing in a facility.

Other objects of the present invention will be understood from the following description.

According to a first aspect of the present invention, there is provided a service providing system (to be referred to as a first providing system hereinbelow) including an entrance detecting unit for inputting a ticket identifier assigned to a ticket of a user having entered a predetermined area and for transmitting the ticket identifier therefrom, an exit detecting unit for inputting the ticket identifier of the user who is about to exit the predetermined area and for transmitting the ticket identifier therefrom, an identifier control unit including an identifier storage unit for receiving the ticket identifier transmitted from the entrance detecting unit and registering the ticket identifier to the identifier storage unit and for receiving the ticket identifier transmitted from the exit detecting unit and erasing a ticket identifier from the identifier storage unit, the ticket identifier matching the ticket identifier received from the exit detecting unit; a request receiving unit for receiving, from a user's unit having stored a ticket identifier and a user's unit identifier, an identifier set of the ticket identifier and the user's unit identifier and a contents request; an identifier collating unit for making a check in response to the contents request thus received, to determine whether or not an identifier set matching the identifier set thus received exists in the identifier storage unit, and outputting a result of the check; and a contents delivery unit for delivering, if the result of check is positive, predetermined digital contents or digital contents desired by the user and identified by the contents request to the user's unit.

In this connection, "ticket" may be a physical medium such as paper or may be electronic data. The electronic data is stored in a portable storing medium such as a card-type memory or an integrated circuit (IC) card. The portable storing medium may also be used as a ticket (the portable recording medium will be referred to as a ticket storing medium hereinbelow).

"Ticket identifier (ID)" may be letters, numeric characters, other symbols, a combination thereof, a bar code, an image, or the like printed on a physical medium. The ticket ID may also be electronic data.

The entrance detecting unit and the exit detecting unit may input the ticket ID through an input of the ticket ID in response to a key operation by a human, by reading a bar code (ticket ID) by a bar-code reader, by shooting an image (ticket ID) by an image pickup or imaging device, or by reading the electronic data (ticket ID) through a contact or contactless reading operation of the ticket storing medium.

"Entered" may be a state in which, for example, the user is entering the facility or is immediately after entering the facility or a state at any timing until the user exits the facility.

"Exit" may be, for example, a state at any timing of the user until he or she exits the facility after he or she enters the facility or a state in which the user is immediately before exiting the facility, the user is exiting the facility, or the user is immediately after exiting the facility.

"User's unit" may be any one of various communication devices which can be utilized by the user. For example, a portable or cellular phone, a personal handy phone system (PHS), or a personal digital assistant (PDA) may be employed.

The user's unit or unit may input the ticket identifier through an input of the ticket ID in response to a key operation by a human, by reading a bar code (ticket ID) by a bar-code reader, by shooting an image (ticket ID) by an image pickup or imaging device, or by reading the electronic data (ticket ID) through a contact or contactless reading operation of the ticket storing medium. The unit stores the ticket identifier in a predetermined storage (e.g., a memory or a hard disk).

"User's unit ID" is information to uniquely identify a user's unit and may be, for example, information including at least one of a production number, an e-mail address, and a cellular phone number.

"Digital contents" may include various contents such as letters and characters, a mobile picture, a still picture, voice and sound, or a combination thereof. When the first providing system includes a position detecting unit to detect a position of each of one or more user's units existing in a predetermined area, the digital contents may be digital contents provided according to a result of the position detection, for example, information indicating congested subareas of the predetermined area or information indicating a position of a user's unit of another person specified by the user.

In a first favorable embodiment of the first providing system, the identifier collating unit registers, when a matching ticket identifier matching the ticket identifier thus received exists in the identifier storage unit and a user's unit identifier matching the matching ticket identifier does not exits in the identifier storage unit, the user's unit identifier of the identifier set thus received to the identifier storage unit with a correspondence established between the matching ticket identifier and the user's unit identifier and outputs a check result indicating a positive result therefrom.

In a second favorable embodiment of the first providing system, the identifier storage unit includes one or more identifier set groups registered thereto, each of the ID set group including one or more ticket identifiers and/or user's unit identifiers, and the contents delivery unit delivers digital contents according to the ID set group.

In a third favorable embodiment of the first providing system, the system further includes an identifier receiving unit for receiving one or more ticket identifiers and/or one or more user's unit identifiers from at least either one of an access point terminal distributed in the predetermined area, the service user's unit, another information processing terminal (e.g., a personal computer) which the user can utilize, and the ticket purchase receiving terminal issuing the ticket to which the ticket identifier is assigned; and a grouping unit for registering group information (e.g., a group identifier generated) regarding a group including the ticket identifiers and/or the user's unit identifiers received as above to the identifier storage unit. In this case, the contents delivery unit may deliver contents according to the group information. For example, to deliver contents to a user's unit, the contents delivery unit may deliver, according to a group to which a ticket identifier and/or a user's unit identifier received from the user's unit belong/belongs, the same contents or different contents associated therewith to one or more other user's units respectively having stored one or more other ticket identifiers and/or user's unit identifiers belonging to the group.

In a fourth favorable embodiment of the first providing system, the system further includes a communication disable control unit for setting the user's unit, in a case in which the user's unit is capable of communicating a call and/or data with an external unit, to a state in which the user's unit cannot conduct the call and/or the data communication, at predetermined timing after the user enters the predetermined area. The communication disable control unit may be arranged in a user's unit or an external device outside the user's unit. "To set a state in which the user's unit cannot conduct the call and/or the data communication" indicates that, for example, in the call, at least one of the call issuance and the call reception becomes impossible; and in the data communication, at least one of the data transmission and the data reception becomes impossible. "The state in which the operations above are impossible" may indicate, for example, in a case of a user's unit such as a cellular phone to conduct a wireless call and/or wireless data communication, a state in which the user is made to recognize that the user is virtually in an area outside a communicable zone and hence cannot conduct the wireless call and/or wireless data communication. Or, the state may indicate a state in which, for example, reception of a call button and a data transmission button is rejected.

According to a second aspect of the present invention, there is provided a service providing system (to be referred to as a second providing system hereinbelow) including an entrance detecting unit for inputting a ticket identifier assigned to a ticket of a user having entered a predetermined area and transmitting the ticket identifier therefrom, an exit detecting unit for inputting the ticket identifier of the user who is about to exit the predetermined area and for transmitting the ticket identifier therefrom, an identifier control unit for receiving the ticket identifier transmitted from the entrance detecting unit and registering the ticket identifier to an identifier storage unit and for receiving the ticket identifier transmitted from the exit detecting unit and erasing a ticket identifier from the identifier storage unit, the ticket identifier matching the ticket identifier received from the exit detecting unit; a plurality of access point terminals distributed in the predetermined area, a request receiving unit for receiving, via a first one of the access point terminals from a user's unit having received and stored a ticket identifier, the ticket identifier and a contents request; an identifier collating unit for making a check in response to the contents request thus received, to determine whether or not a ticket identifier matching the ticket identifier thus received exists in the identifier storage unit, and outputting a result of the check; and a contents delivery unit for delivering, if the result of check is positive, predetermined digital contents or digital contents desired by the user and identified by the contents request via the first access point terminal to the user's unit.

According to a third aspect of the present invention, there is provided a service providing system (to be referred to as a third providing system hereinbelow) including an entrance detecting unit for inputting a ticket identifier assigned to a ticket of a user having entered a predetermined area and transmitting the ticket identifier therefrom, an exit detecting unit for inputting the ticket identifier of the user who is about to exit the predetermined area and for transmitting the ticket identifier therefrom, an identifier control unit for receiving the ticket identifier transmitted from the entrance detecting unit and registering the ticket identifier to identifier storage unit and for receiving the ticket identifier transmitted from the exit detecting unit and erasing a ticket identifier from the identifier storage unit, the ticket identifier matching the ticket identifier received from the exit detecting unit; an identifier receiving unit for receiving one or more ticket identifiers from at least either one of an access point terminal distributed in the predetermined area, a service user's unit, another information processing terminal which the user can utilize, and a ticket purchase receiving terminal issuing the ticket to which the ticket identifier is assigned; a grouping unit for registering group information regarding a group including the ticket identifiers received as above to the identifier storage unit, a request receiving unit for receiving, from the user's unit having received and stored a ticket identifier, the ticket identifier and a contents request; an identifier collating unit for making a check in response to the contents request thus received, to determine whether or not a ticket identifier matching the ticket identifier thus received exists in the identifier storage unit, and outputting a result of the check; and a contents delivery unit for delivering, if the result of check is positive, predetermined digital contents or digital contents desired by the user and identified by the contents request via the first access point terminal to the user's unit, according to the group information.

According to a fourth aspect of the present invention, there is provided a service providing system (to be referred to as a fourth providing system hereinbelow) including an entrance detecting unit for inputting a ticket identifier assigned to a ticket of a user having entered a predetermined area and for transmitting the ticket identifier therefrom, an exit detecting unit for inputting the ticket identifier of the user who is about to exit the predetermined area and for transmitting the ticket identifier therefrom, an identifier control unit for receiving the ticket identifier transmitted from the entrance detecting unit and registering the ticket identifier to identifier storage unit and for receiving the ticket identifier transmitted from the exit detecting unit and erasing a ticket identifier from the identifier storage unit, the ticket identifier matching the ticket identifier received from the exit detecting unit; a request receiving unit for receiving, from a user's unit having received and stored a ticket identifier, the ticket identifier and a contents request; an identifier collating unit for making a check in response to the contents request thus received, to determine whether or not a ticket identifier matching the ticket identifier thus received exists in the identifier storage unit, and outputting a result of the check; and a contents delivery unit for delivering, if the result of check is positive, predetermined digital contents or digital contents desired by the user and identified by the contents request via the first access point terminal to the user's unit. The ticket identifier includes a ticket identifier type including an attribute of the ticket and/or an attribute regarding the user possessing the ticket, and the contents delivery unit delivers digital contents according to the ticket identifier type to the user's unit.

According to a fifth aspect of the present invention, there is provided a service providing system including an entrance detecting unit for detecting an event that a user enters a predetermined area and a user's unit to be used by a user. When a ticket identifier is inputted to the entrance detecting unit and the user's unit possessing a predetermined user's unit identifier transmits a contents request, only the user's unit can receive the contents.

In accordance with the present invention, it is possible to prevent any illegal use of useful contents.

BRIEF DESCRIPTION OF THE DRAWINGS

FIG. 3 is a diagram showing an example of an identifier control database.

FIG. 4 is a diagram showing an example of a delivery record database.

FIG. 7 is a diagram showing an example of a screen for the user of the entrance and exit control unit to conduct fee adjustment.

DESCRIPTION OF THE EMBODIMENTS

Figure 1:
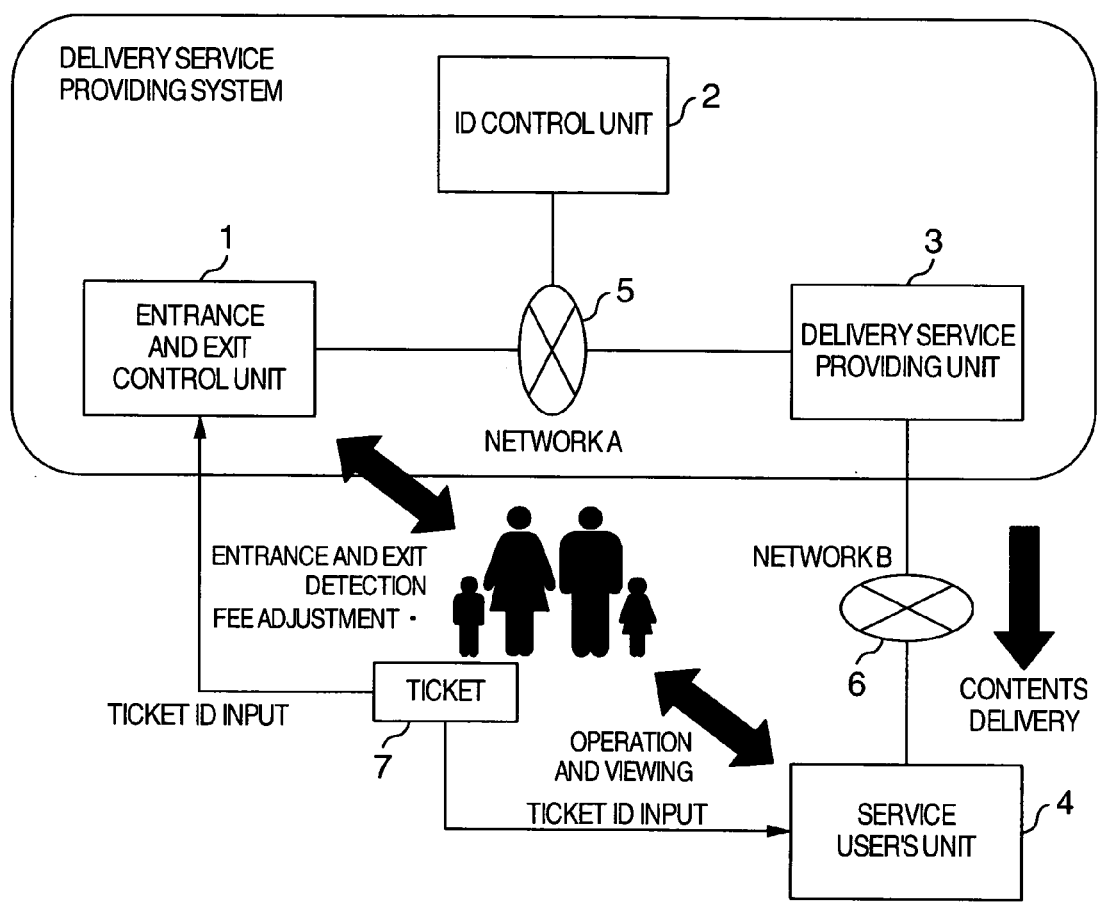
FIG. 1 is a block diagram showing an outline of the overall configuration of a system including a first embodiment in accordance with the present invention.

Referring now to the drawings, description will be given of an embodiment of the present invention.

FIG. 1 shows an outline of the overall system including a first embodiment of the present invention.

In the embodiment, a delivery service providing system is configured. In the system, only when a user having a service user's unit 4 enters a predetermined facility (e.g., a building or a piece of land), predetermined digital contents or digital contents (to be referred to as contents hereinbelow) desired by the user are sent to the service user's unit 4. When the user exits the facility, predetermined contents or contents desired by the user are not transmitted to the unit 4.

The delivery service providing system includes an entrance and exit control unit 1, an ID control unit 2, and a delivery service providing unit 3. The units 1, 2, and 3 can communicate with each other via a network A and can communicate with other units 1, 2, and 3 via wired or radio communication.

The entrance and exit control unit 1 is a computer to control an event in which the user enters the predetermined facility and an event in which the user exits the facility. Specifically, for example, when the user enters the facility, the unit 1 reads a ticket identifier attached onto a ticket 7 of the user through a contact or contactless reading operation to thereby input the ticket ID. When the user exits the facility, the unit 1 asks the user to conduct fee adjustment according to information of accounting associated with the ticket identifier.

The ID control unit 2 is a computer to control a ticket identifier (ID) and an identifier (to be referred to as "user's unit ID hereinbelow") of the service user's unit 4 using a database (to be referred to as "ID control database hereinbelow"). For example, when the user enters the facility and the entrance and exit control unit 1 reads the ticket identifier, the ID control unit 2 receives the ticket ID from the unit 1 to register the ticket ID to the ID control database. The ID control unit 2 receives an ID collation request together with the ticket ID and the user's unit ID from the delivery service providing unit 3. The unit 2 then collates, in response to the request, the ticket ID with an associated ticket ID registered to the ID control database. When the user exits the facility (or when the service providing operation is stopped as a result of the adjustment), the ID control unit 2 erases the ticket ID registered as above from an ID control table (or, substantially erase the ticket ID by updating the status of the ticket ID from "entered" to "exited").

The delivery service providing unit 3 is a computer to deliver contents. The unit 3 stores contents and delivers predetermined contents or contents desired by the user to the service user's unit 4 of the user having entered the predetermined facility. For example, when a contents request is received together with the ticket ID and the user's unit ID via a network B (e.g., a local area network (LAN) or the internet) 6 from the service user's unit 4, the delivery service providing unit 3 sends the collation request together with the ticket ID and the user's unit ID to the ID control unit 2. The unit 3 receives a result of the collation in response to the ID collation request. If it is recognized according to the collation result that the ticket ID and the user's unit ID are valid, the unit 3 delivers predetermined contents or contents desired by the user to the service user's unit 4 as the contents request source. On the other hand, if it is recognized that at least either one of the ticket ID and the user's unit ID is invalid, the unit 3 delivers an error message, in place of the predetermined contents or the contents desired by the user, to the service user's unit 4.

The service user's unit 4 is an information processing terminal which is a portable unit for the user. The unit 4 stores a user's unit identifier unique to the unit 4. The unit 4 inputs a ticket ID assigned or attached to a ticket, for example, by reading the ticket ID through a contact or contactless reading operation and stores the ticket ID. According to an operation by the user, the unit 4 transmits the ticket ID, the user's unit ID beforehand stored, and a contents request to the delivery service providing unit 4. When contents are received in response to the contents request, the service user's unit 4 outputs the contents in a method corresponding to a type of the contents. For example, if the contents are an image or text file, the unit 4 displays an image of a text stored in the file on a display screen. If the contents are a computer program, the unit 4 executes the program to display a mobile picture or the like.

Next, description will be given in detail of the overall system of the embodiment.

Figure 2:
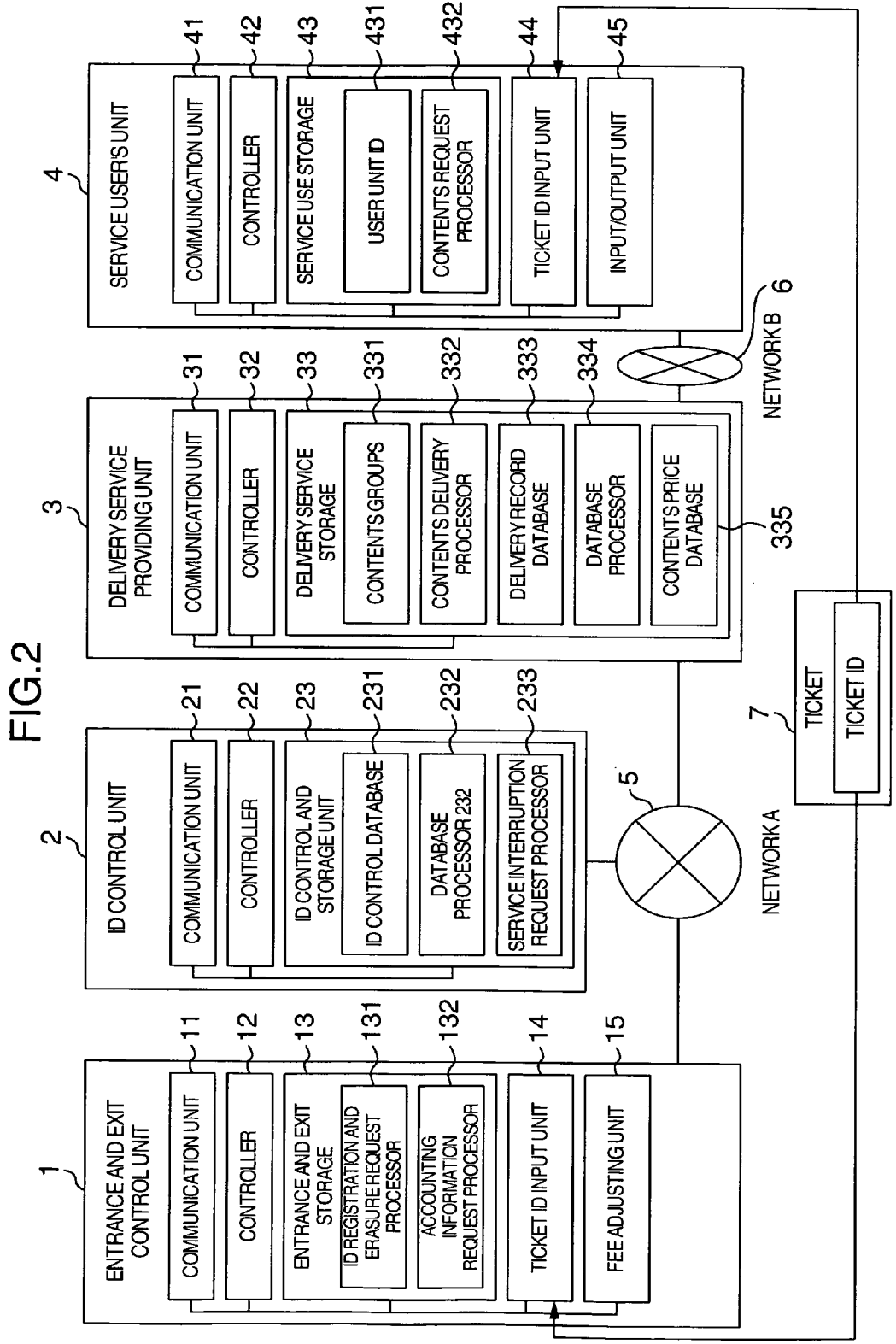
FIG. 2 is a block diagram showing configurations of respective units of the system of the first embodiment.

FIG. 2 shows configurations of the respective units of the entire system of the embodiment.

The ticket 7 and the ticket ID assigned thereto can be issued at any timing in an arbitrary way only if the delivery service providing system recognizes the ticket ID of the ticket 7 possessed by the user having entered a predetermined facility.

That is, for example, the ticket 7 indicates the right for the user of an entrance ticket or a railroad ticket to receive a predetermined service and may be a physical recording medium such as paper or an electronic item to be stored in a predetermined storage. The storage may be a portable storing medium (for example, a card-type memory such as an IC card) which can communicate with the service user's unit 4 and the entrance and exit control unit 1.

The ticket 7 may be issued to the user, for example, before the user enters the predetermined facility or when the user is going to enter the facility.

When the ticket 7 is, for example, a physical recording medium such as paper, the identifier may be a visible item such as numeric characters, symbols, a bar code, or an image printed on the medium. When the ticket 7 is, for example, an electronic item, the ticket identifier may be electronic data added to the ticket 7.

The entrance and exit control unit 1 includes a communication unit 11, an entrance and exit storage 13, a ticket ID reader 14, an adjusting unit 15, and a controller 12.

The communication unit 11 is a device to communicate via a network A 5 with an external device, e.g., the ID control unit 2 or the delivery service providing unit 3. Specifically, the unit 11 is, for example, a radio transceiver including a radio antenna.

The entrance and exit storage 13 is a device including at least one of a volatile memory such as a random access memory (RAM), a nonvolatile memory such as a read only memory (ROM) or an electrically erasable and programmable ROM (EEPROM), and a hard disk. The unit 13 stores therein an ID registration and erasure request processor 131 and a accounting information request processor 132. The processor 131 is a computer program to make a computer execute an operation to transmit a ticket ID and an ID registration request to the ID control unit 2. The processor 132 is a computer program to make a computer execute operation to send an accounting information request together with the ticket ID to the delivery service providing unit 3.

The ticket ID input unit 14 is a device to input a ticket identifier attached to the ticket 7 to store the ticket ID in the entrance and exit storage 13. Specifically, the unit 14 may be, for example, a bar-code reader to read a bar code (ticket ID) printed on the ticket 7 or a device to read ticket ID from a portable recording medium having stored an electronic ticket.

The adjusting unit 15 is a device which requests, according to the accounting information from the delivery service providing unit 3, the user who is going to exit the facility to pay an amount for the contents received by the user. The unit 15 conduct adjustment for the amount using at least one of cash, electronic money, a credit card, and the like.

The controller 12 is a device to control the overall operation of the entrance and exit control unit 1 and is, for example, a central processing unit (CPU). For example, the controller 12 reads the ID registration and erasure request processor 131 and the accounting information request processor 132 from the entrance and exit storage 13 to send an ID registration or erasure request via the communication unit 11 to the ID control unit 2 or to send an accounting information request via the communication unit 11 to the delivery service providing unit 3.

The ID control unit 2 includes a communication unit 21, an ID control and storage unit 23, and a controller 22.

The communication unit 21 is a device to communicate via the network A 5 with an external device, e.g., the entrance and exit control unit 1 or the delivery service providing unit 3. The unit 21 is, for example, a radio transceiver including a radio antenna.

The ID control and storage unit 23 is a device including at least one of a volatile memory such as an RAM, a nonvolatile memory such as an ROM or an EEPROM, and a hard disk. The unit 23 includes a database processor 232, a service interruption request processor 233, and an ID control database 231.

The database processor 232 is a computer program to make a computer execute various processing for the ID control database 231.

The service interruption request processor 233 is a computer program to make a computer execute processing to send a service interruption request, which will be described later, to the delivery service providing unit 3.

The ID control database 231 is used to register thereto, for a plurality of ticket identifiers, a plurality of user's unit identifiers, items of entrance day and time, and items of exit day and time as shown in FIG. 3.

As can be seen from FIG. 3, for example, a ticket ID erased or a ticket ID not erased is registered to each cell of the ticket ID registration column 2311. "Erased" indicates that the user possessing the ticket ID has already exited the facility. After the user exits the facility, the ticket ID of the user may be completely erased or may remain with the status of "erased" as shown in FIG. 3. The item of the ticket ID is not erased in this case.

The cells of the unit ID registration column 2312 includes in association with a ticket identifier registered to the cell on the left-hand side, for example, a user's unit ID erased, a user's unit ID not erased, or a cell not registered. For the cell not registered, a ticket identifier is registered to the cell on the left-hand side, but a user's unit ID corresponding thereto is not registered. The cell not registered cell occurs after the ID control unit 2 receives a ticket ID from the entrance and exit control unit 1 if a contents request is not issued at all from the service user's unit 4 in which the ticket ID is stored. After the unit 4 issues a contents request together with the ticket ID and the user's unit ID, the user's unit ID is registered to the "registered cell not registered" in a processing flow, which will be described in detail later.

An item of entrance day and time is registered to each cell of the entrance day and time registration column 2313 for an associated ticket identifier.

For each ticket ID, the exit day and time is set to each cell of the exit day and time registration column 2314. However, for a ticket ID for which the entrance is detected but the exit is not detected, status data indicating "entered" is set to the cell corresponding to the ticket ID.

Description will be given by referring again to FIG. 2.

The controller 22 of the ID control unit 2 is a device to control the overall operation of the ID control unit 2 and is, for example, a CPU. For example, the controller 22 reads the database processor 232 and the service interruption request processor 233 from the ID control and storage unit 23 to execute registration or erasure processing for the ID control database 231 and to transmit a service interruption request, which will be described later, to the delivery service providing unit 3.

The unit 3 includes a communication unit 31, a delivery service storage 33, and a controller 32.

The communication unit 31 is a device to communicate via the network A 5 with an external device (the entrance and exit control unit 1 or the ID control unit 2). Specifically, the unit 31 is, for example, a radio transceiver including a radio antenna.

The delivery service storage 33 is a device including at least one of a volatile memory such as an RAM, a nonvolatile memory such as an ROM or an EEPROM, and a hard disk. The unit 33 stores therein contents groups 331, a contents delivery processor 332, a delivery record database 333, a database processor 334, and a contents price database 335.

The contents group 331 includes contents which the delivery service providing unit 3 can deliver. The contents include contents identifier information so that the contents can be identified by the contents identifier information.

The contents delivery processor 332 is a computer program to make a computer deliver contents.

For the respective ticket identifiers, the delivery record database 333 stores therein user unit identifiers, items of delivery day and time, contents attribute information, and charged amount as shown in FIG. 4.

Each cell of the ticket ID registration column 3331 is used to register a ticket ID thereto as shown in FIG. 4.

Each cell of the unit ID registration column 3332 is used to register a user's unit identifier corresponding to a ticket identifier registered to a cell on the left-hand side.

Each cell of the delivery day and time registration column 3333 is used to register thereto the day and time at which contents are delivered to a service user's unit 4 storing the user's unit ID and the ticket ID on the left-hand side. The delivery day and time recorded in each cell may be updated to the latest record or may be additionally stored as historical data each time contents are delivered.

To each cell of the contents attribute registration columns 3334, there is registered contents attribute information regarding attributes of contents delivered at the delivery day and time in the cell on the left. The contents attribute information includes, for example, a contents type such as "movie" or "incoming melody" and contents identifier information, e.g., "no. 80" to identify the contents. The contents attribute information is additionally recorded in the associated cell each time contents corresponding to the cell are delivered.

To each cell of a charged amount registration field 3335, an amount charged for the contents delivered at the delivery day and time in the cell on the left is registered. The charged amount of contents is additionally recorded in the cell each time contents corresponding to the cell are delivered.

Referring again to FIG. 2, description will be given of operation of the system.

The database processor 334 of the delivery service providing unit 3 is a computer program to make a computer execute various processing for the delivery record database 333.

To the contents price database 335, the amount corresponding to each contents identifier information or a contents type of contents included in the contents group 331 is registered.

The controller 32 is a device, for example, a CPU to control the overall operation of the delivery service providing unit 3. For example, the controller 32 reads the contents delivery processor 332 and the database processor 232 from the contents service storage 33 to send contents to the service user's unit 4 and to execute registration processing for the delivery record database 333.

The service user's unit 4 includes a communication unit 41, a service use storage 43, a ticket ID input unit 44, an input/output unit 45, and a controller 42.

The communication unit 41 is a device to communicate via a network B 6 with an external device, e.g., the delivery service providing unit 3. The unit 41 is, for example, a radio transceiver including a radio antenna.

The service use storage 43 is a device including at least one of a volatile memory such as an RAM, a nonvolatile memory such as an ROM or an EEPROM, and a hard disk. The unit 43 stores therein a user's unit ID 431 and a contents request processor 432. The user's unit ID 431 is information to uniquely identify a service user's unit 4 and includes, for example, at least one of a production number, an e-mail address, and a cellular phone number. The contents request processor 432 is a computer program to make a computer execute an operation to transmit a contents request to the delivery service providing unit 3.

The ticket ID input unit 44 is a device to input a ticket identifier attached to the ticket 7 to store the identifier in the entrance and exit storage 13. Specifically, the unit 44 may be, for example, a device to input a ticket identifier according to a key operation by a human, by a bar-code reader to read a bar code (ticket ID) printed on the ticket 7, or by a device to read ticket ID from a portable recording medium having stored an electronic ticket.

The input/output unit 45 includes an input device including a plurality of keys or the like to input codes of letters and numeric characters and an output device including a display screen to display an image and letters and characters, a speaker to produce sound and voice, and the like.

Figure 5:
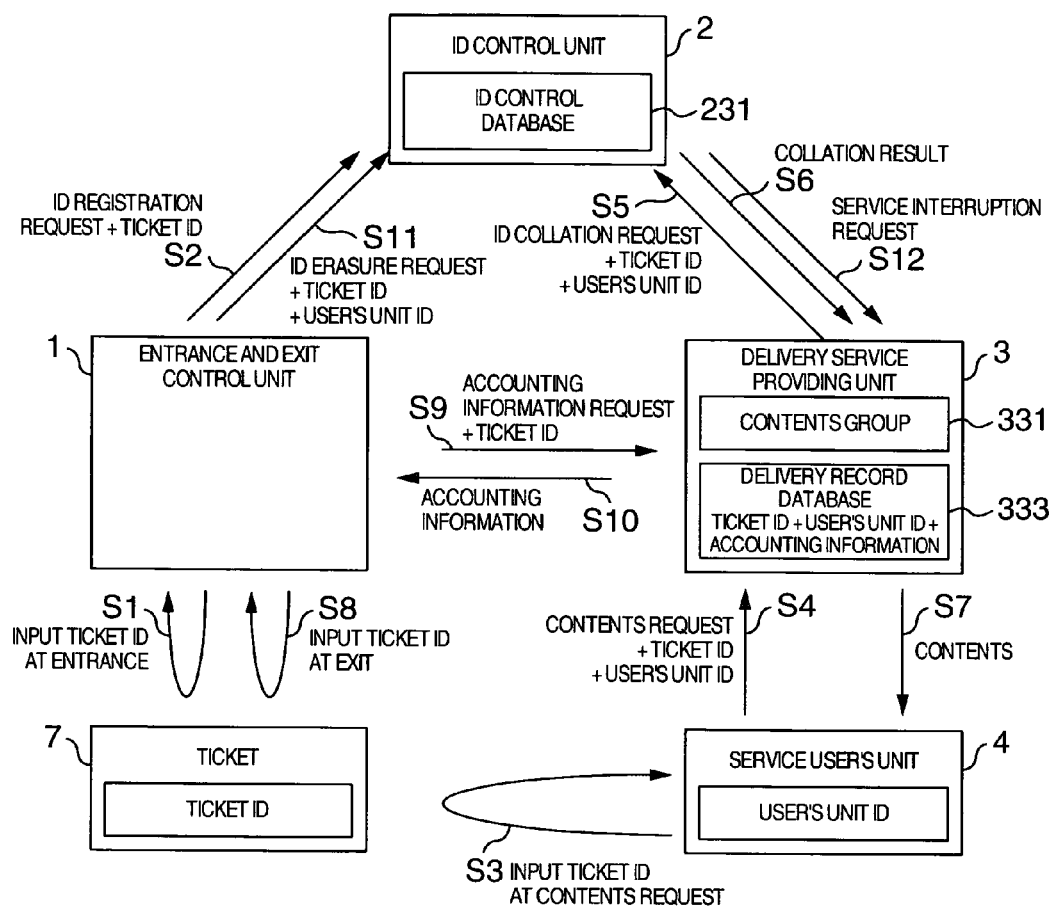
FIG. 5 is a flow diagram showing a processing flow from when a user enters a predetermined facility to when the user exits the facility in the first embodiment of the present invention.

FIG. 5 shows an outline of a processing flow from when a user enters a predetermined facility to when the user exits the facility in the embodiment. Description will now be given of the flow of the embodiment by referring to FIG. 5.

In the facility, there are disposed an entrance and exit gate, now shown, and one or more entrance and exit control units 1 in the proximity of the gate.

The user possesses a physical ticket such as a paper ticket or an electronic ticket (to be simply referred to as a ticket hereinbelow) 7 stored in a portable storing medium, e.g., a card-type nonvolatile memory. The ticket 7 includes a ticket identifier assigned thereto.

To enter the facility, the user (or an employee of the facility) inserts or places the ticket 7 in or over a predetermined position of the unit 1 to make the unit 1 read the ticket identifier of the ticket 7. The ticket ID input unit 14 of the unit 1 reads the ticket identifier from the ticket 7 (step S1) and makes the entrance and exit storage 13 temporarily store the ticket ID. The controller 12 reads the ticket identifier and transmits the ticket identifier and an ID registration request (a request to register the ticket identifier) via the communication unit 11 to the ID control unit 2 (S2).

When the ID registration request and the ticket ID are received via the communication unit 21 from the entrance and exit control unit 1, the controller 12 of the ID control unit 2 resisters, in response to the ID registration request, the ticket identifier to the ID control database 231.

After the unit 1 reads the ticket identifier and the user enters the facility, the ticket ID input unit 44 of the service user's unit 4 receives, according to an operation of the user, an input of the ticket identifier of the ticket 7 possessed by the user (e.g., through a key operation or a reading operation) and then stores the ticket ID in the storage 43 (S3).

Thereafter, the controller 42 of the unit 4 accesses, according to an operation of the user, the storage 43 to read therefrom the ticket identifier stored in step S3 and the user's unit identifier beforehand stored and then sends the ticket ID, the user's unit ID, and a contents request via the communication unit 41 to the delivery service providing unit 3 (S4). The contents request includes, for example, one or more contents identifier information items respectively corresponding to one or more contents selected from the contents group 331 using a predetermined graphical user interface (GUI) supplied from the unit 3. The contents request is issued to request delivery of contents associated with the contents identifier information items.

When the ticket ID, the user's unit ID, and the contents request are received via the communication unit 31 from the service user's unit 4, the controller 32 of the delivery service providing unit 3 sends the ticket ID, the user's unit ID, and an ID collation request (a request for collation to determine whether or not the ticket ID and the user's unit ID are valid) via the communication unit 31 to the ID control unit 2 (S5). The controller 32 of the delivery service providing unit 3 also registers a set of the ticket ID and the user's unit ID to the delivery record database 333.

When the ticket ID, the user's unit ID, and the ID collation request are received via the communication unit 21 from the delivery service providing unit 3, the controller 22 of the ID control unit 2 collates the ticket ID and the user's unit ID with a group of associated information items recorded in the ID control database 231.

In a case in which the contents request sent in step S4 is the first contents request, the user's unit ID corresponding to the ticket ID has not been registered to the database 231 even if the ticket ID has been registered thereto as described above. When it is determined as a result of the collation that the ticket ID (to be referred to as a matching ticket ID hereinbelow) matching the ticket ID received from the unit 3 is registered to the database 231 and the user's unit ID corresponding to the matching ticket ID is not registered to the database 231, the controller 22 of the unit 2 establishes a correspondence between the user's unit ID received from the unit 3 and the matching ticket ID and registers the user's unit ID to the database 231. The controller 22 also sends a collation result of the matching state (to be referred to as collation result OK hereinbelow) to the delivery service providing unit 3 (S6).

On the other hand, if the matching ticket ID is absent from the database 231 or if the matching ticket is present but the user's unit ID corresponding thereto does not match the user's unit ID received from the unit 3 as a result of the collation, the controller 22 of the unit 2 sends a collation result of the mismatching state (to be referred to as collation result NG hereinbelow) to the delivery service providing unit 3 (S6).

When the collation result OK is received from the ID control unit 2, the controller 32 of the unit 3 sends, to the service user's unit (to be referred to as a target user's unit hereinbelow) 4 as the source of the contents request source received in step S4, one or more contents respectively identified by one or more contents identifier information items of the contents request received in step S4. According to the contents identifier information items, the controller 32 obtains one or more charged amount items respectively corresponding to the contents from the contents price database 335. The controller 32 then registers the charged amount items to the database 333 with a correspondence established between the charged amount items and the ticket ID and the user's unit ID of the target user's unit 4. The controller 32 also registers contents attribute information items (e.g., contents types and contents identifier information items) of the delivered contents to the database 333 with a correspondence established between contents attribute information items and the ticket ID and the user's unit ID of the target user's unit 4.

Figure 6:
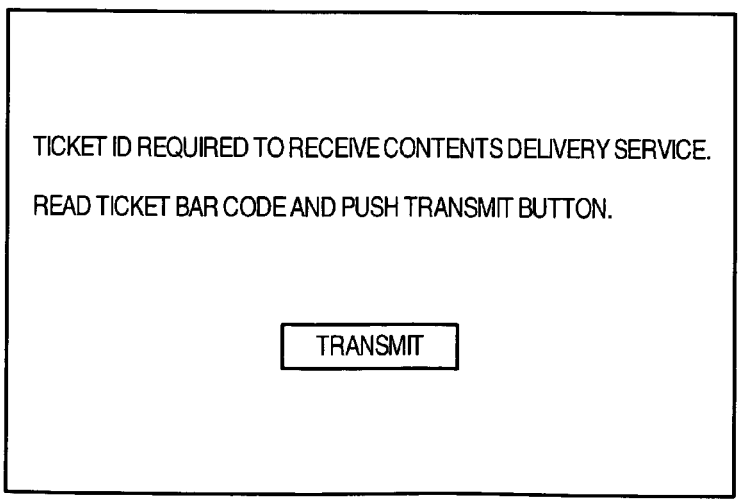
FIG. 6 is a diagram shown an example of a screen for the user of a service user's unit to read the ticket identifier.

On the other hand, when the collation result NG is received from the ID control unit 2, the controller 32 sends a predetermined error message to the target user's unit 4 (or, does not transmit any information). When the message is received, the controller 42 of the service user's unit 4 displays on a display screen of the unit 4 the error message as shown in FIG. 6. This is an example in which the ticket 7 is a physical recording medium such as paper and the ticket ID is a bar code printed on the medium. The unit 4 includes a bar code reader as the ticket ID input unit 44. According to an operation of the user, the unit 4 reads by the bar-code reader 4 the bar code (ticket ID) of the ticket 7. When the transmit button 10 is depressed, the service user's unit 4 executes step S4 (that is, transmits a contents request together with the ticket ID and the user's unit ID beforehand stored).

To exit the facility, the user (or an employee of the facility) inserts or places the ticket 7 in or over a predetermined position of the unit 1 to make the unit 1 read the ticket ID of the ticket 7. The ticket ID input unit 14 of the unit 1 reads the ticket ID from the ticket 7 (step S8) and temporarily stores the ticket ID in the entrance and exit storage 13. The controller 12 reads the ticket ID from the storage 13 and transmits the ticket ID and an accounting information request to the delivery service providing unit 3 (S9).

When the ticket ID and the accounting information request is received, the controller 32 of the unit 3 acquires a user's unit ID, a delivery day and time item, contents attribute information, and a charged amount corresponding to the ticket ID from the delivery record database 333 and then transmits accounting information including the user's unit ID, the delivery day and time item, the contents attribute information, and the charged amount to the entrance and exit control unit 1 (S10).

According to the accounting information, the controller 12 of the unit 1 displays a message (or produces sound and voice) of the charged amount of the accounting information to the user, for example, as shown in FIG. 7. The user can pay the amount of money from the adjusting unit 15 of the unit 1 in various ways using, for example, cash, electronic money, and a credit card.

When the controller 2 of the unit 1 detects that the charged amount is completely paid, the controller 2 sends the ticket identifier read from the storage 13, the user's unit identifier of the received accounting information, and an ID erasure request to the ID control unit (S11).

When the ID erasure request is received, the controller 22 of the unit 2 retrieves from the ID control database 231 a matching ticket identifier and a matching user's unit identifier matching respectively with the ticket ID and the user's unit ID received together with the request. The controller 22 then updates the statuses of the matching ticket ID and the matching user's unit ID to "erased" (or completely deletes the items) and then records an exit time and day item corresponding thereto. The controller 22 then sends the ticket ID and the user's unit ID, which are erased as above, and a service interruption request to the delivery service providing unit 3.

When the service interruption request is received, the controller 32 of the unit 3 retrieves from the delivery record database 333 a matching ticket ID and a matching user's unit ID matching respectively with the ticket ID and the user's unit ID received together with the service interruption request. The controller 32 then updates the statuses of the matching ticket ID and the matching user's unit ID to "service interrupted" (or completely deletes the items). As a result, when a contents request is received from a service user's unit 4 together with the ticket ID and the user's unit ID from the service user's unit 4 of the user having exited the facility, since the ticket ID and the user's unit ID are set to "service interrupted" in the database 333 (or are deleted and not registered thereto), the delivery service providing unit 3 cannot deliver contents to the service user's unit 4.

Description has been given of the first embodiment.

According to the first embodiment, a check is made to determine whether or not the ticket ID and the user's unit ID received from the user's unit are valid. In accordance with the check, even when an attempt is made to receive contents by use of a ticket ID (an illegal ticket ID) illegally passes to some person outside the facility, it is quite unlikely that the user's unit ID of the user's unit which utilizes the illegal ticket is regarded as valid. In consequence, it is possible to prevent an event in which the contents delivery service is illegally used by any person outside the facility.

In the first embodiment, the entrance and exit control unit 1 inputs (e.g., reads) the ticket ID when the user enters the facility and when the user exits the facility. However, whether the ticket ID read by the unit 1 is obtained when the user enters or exits the facility can be determined in a predetermined method. For example, the entrance and exit control unit 1 may be separated into an entrance control unit which reads the ticket ID when the user enters the facility to issue an ID registration request and an exit control unit which reads the ticket ID when the user exits the facility to issue an ID erasure request. It is also possible that the entrance and exit control unit 1 includes interfaces, which each receive the ticket ID, at positions respectively corresponding to the user's moving directions of when the user enters the facility and when the user exists the facility. Thanks to the configuration, whether the user enters or exits the facility can be determined according to which one of the interfaces is used to receive the ticket ID.

It is also possible that, for example, when a ticket 7 including a ticket ID is purchased, a predetermined information processing terminal to issue the ticket 7 sends an ID registration request together with the ticket ID to the ID control unit 2 such that the ticket ID is registered to the ID control database 231. That is, the ticket ID of the ticket 7 may be registered to the database 231 before the user enters the facility. In this case, to prevent an event in which the ticket ID is illegally used to receive the contents delivery service, the ID control unit 2 additionally sets a status of, for example, "not entered" to the ID control database 231 for the pertinent ticket ID until the user enters the facility and the ticket ID is inputted to be delivered to the ID control unit 2. Due to this operation, when an ID collation request is received for the ticket identifier having the status "not entered", the ID control unit sends "collation result NG" to the delivery service providing unit 3.

For example, although the ID control unit 2 and the delivery service providing unit 3 are separated from each other, the units 2 and 3 may also be implemented in one unit.

The user's unit identifier may be registered to the ID control database 231 not only when the first contents request is issued but also at another timing. For example, according to an operation by the user, the service user's unit 4 may send the ticket identifier and the user's unit identifier to the ID control unit 2 at timing desired by the user.

In accordance with the first embodiment, when the user enters the predetermined facility, the ticket identifier assigned to the ticket 7 is registered to the ID control database 231 of the ID control unit 2. Thereafter, until the user exits the facility, the ticket identifier substantially equal to the ticket identifier obtained from the ticket 7 is kept registered to the database 2. Therefore, the service user's unit 4 can receive contents desired by the user or predetermined contents using the ticket identifier as many times as desired by the user. When the user exits the facility, the ticket identifier of the ticket 7 is erased from the ID control database 231. Therefore, even if the service user's unit 4 issues a contents request together with the ticket identifier obtained from the ticket 7, it is impossible to receive the contents. It is hence guaranteed that the contents delivery service is provided only to a user existing in the predetermined facility.

According to the first embodiment, a check is made to determine whether or not the ticket identifier and the user's unit identifier are valid. Therefore, only one user's unit identifier corresponds to one ticket identifier. It is hence possible to prevent an illegal ticket ID use in which one ticket identifier is illegally used by a plurality of users from the respective service user's units 4.

In accordance with the first embodiment, when the user first receives the service (i.e., the service user's unit 4 first sends a contents request), the user's unit identifier is not registered to the ID control unit 2, and only the ticket identifier is collated. In the collation for the first service use, the user's unit identifier is registered to the ID control unit 2. At collation in a second and subsequent service uses, two identifiers (i.e., a set of the ticket identifier and user's unit identifier) from the service user's unit 4 are collated. As a result, the service user's unit 4 which has first sent a contents request together with a set of the ticket ID and user's unit ID can thereafter receive contents until the user exits the facility.

Next, description will be given of a second embodiment of the present invention. The sections which are almost the same as those of the first embodiment will not be described again or will be briefly described.

Figure 8:
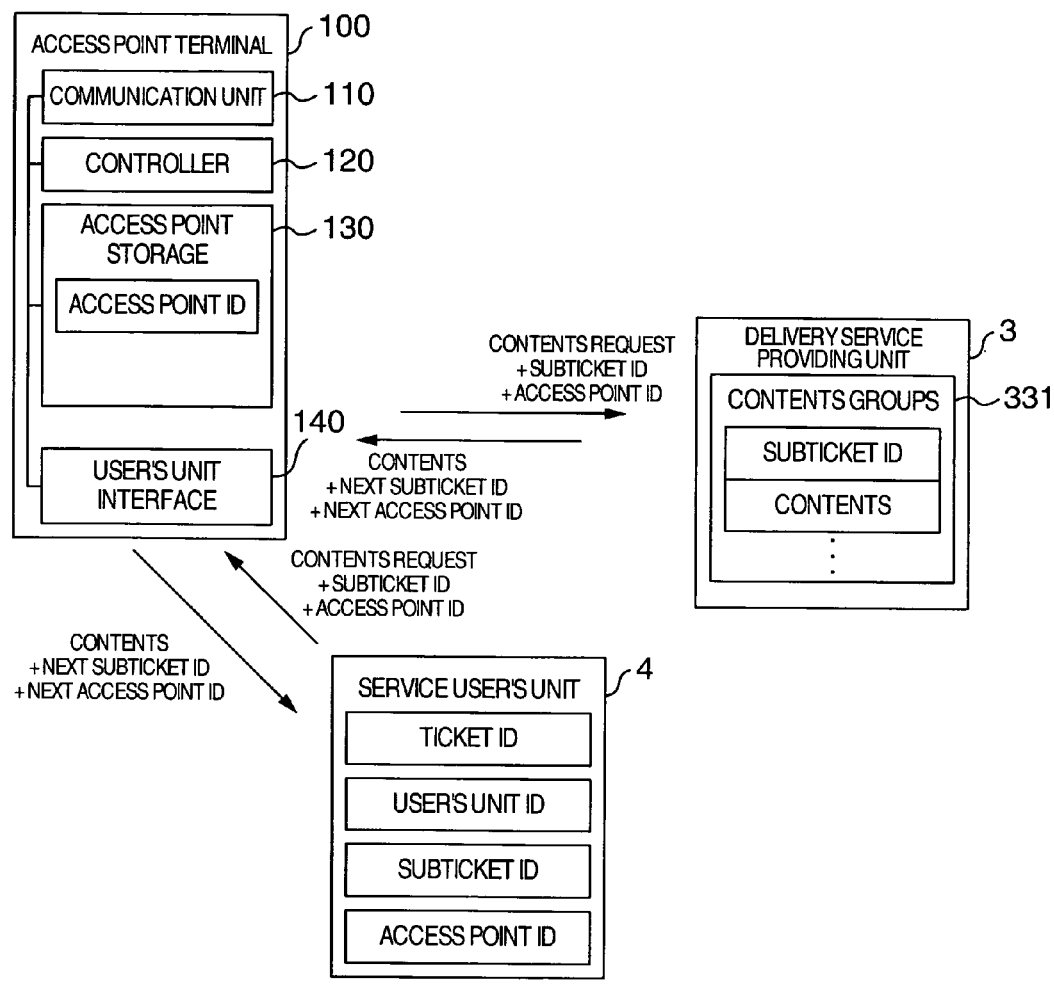
FIG. 8 is a block diagram to explain primary sections of a second embodiment according to the present invention.

FIG. 8 is a block diagram to explain main sections of the second embodiment.

In the second embodiment, to avoid the user's unit identifier and to prevent an illegal access from any position outside the predetermined facility, a plurality of access point terminals 100 are distributed in the facility. Each access point terminal 100 is a communication repeater for communication between the service user's unit 4 and the delivery service providing unit 3. The terminal 100 includes a communication unit 110, an access point storage 130, a user's unit interface 140, and a controller 120.

The communication unit 110 is a device to communicate via the network A 5 with an external device, e.g., the ID control unit 2 the delivery service providing unit 3. The unit 21 is, for example, a radio transceiver including a radio antenna.

The access point storage 130 is a device including at least one of a volatile memory such as an RAM, a nonvolatile memory such as an ROM or an EEPROM, and a hard disk. The storage 130 stores an access point identifier, i.e., identifier information of the access point terminal 100.

The user's unit interface 140 is an interface unit to communicate with the service user's unit 4. The interface 140 communicates via a wired communication system or a radio communication system e.g., a short distance wireless communication system such as an infrared ray communication system or Bluetooth (registered trademark) with the service user's unit 4.

The controller 120 is a device to control the overall operation of the access point terminal 100 and is, for example, a central processing unit (CPU). For example, the controller 120 controls communication with the service user's unit 4 and communication with the delivery service providing unit 3.

In the unit 3 of the second embodiment, subticket identifiers are assigned to respective contents in at least one contents group 331. For each contents group 331, a contents delivery sequence is recognizably stored in an order of subticket identifiers (e.g., the subticket ID sequence is registered for each content group 331 to the delivery service storage 33).

Although not shown, the delivery service storage 33 stores all access point identifiers respectively corresponding to all access point terminals 100 existing in the predetermined facility.

Referring now to FIG. 8, description will be given of an operation flow of the contents delivery service.

Although not shown, after the user enters the facility, the service user's unit 4 first sends a ticket identifier obtained and stored in advance and a contents request to an access point terminal 100 desired by the user or a predetermined access point terminal 100. The terminal 100 then transmits the ticket identifier, the contents request, and an access point identifier stored therein to the delivery service providing unit 3. The unit 3 sends the ticket identifier and a collation request to the ID control unit 2. If "collation result OK" is received in response to the request, the unit 3 may send predetermined contents with another identifier such as a subticket identifier relating to the ticket identifier and an access point identifier beforehand assigned to the predetermined contents or an access point identifier arbitrarily obtained, to the access point terminal 100 as the contents request source. The terminal 100 transmits the predetermined contents, the subticket identifier, and the access point identifier to the service user's unit 4. The unit 4 receives and stores the predetermined contents, the subticket identifier, and the access point identifier in the service use storage 43.

Thereafter, when the user conducts a predetermined operation from the access point terminal (to be referred to as a target access point terminal hereinbelow) 100 corresponding to the access point identifier received from the terminal 100, the service user's unit 4 conducts communication, for example, as below.

As can be seen from FIG. 4, the controller 42 of the unit 4 sends a contents request (e.g., an answer when the contents are quiz contents), a subticket identifier, and an access point identifier via the communication unit 41 to the target access point terminal 100.

The controller 120 of the terminal 100 makes a check to determine whether or not the access point ID received via the interface 140 from the unit 4 matches the access point ID stored in the access point storage 130. If a matching state is not obtained as a result of the check, the controller 120 sends a predetermined message (for example, a message of "the terminal 100 cannot be used") to the service user's unit 4. If a matching state is obtained, the controller 120 sends the subticket identifier, a content request, and the access point identifier stored therein via the communication unit 110 to the delivery service providing unit 3.

When the items are received from the terminal 100, the controller 32 of the unit 3 operates in response to the contents request. According to the subticket ID, the controller 32 obtains from the contents group 331 contents having a predetermined subticket ID (for example, a subticket ID next in the sequence of the received subticket ID). The controller 32 also obtains, according to the received access point ID, a predetermined access point ID (e.g., an access point ID next in the sequence to the received access point ID) from the delivery service storage 33. The controller 32 then transmits the contents with the subticket ID and the access point ID via the communication unit 31 to the access point terminal 100.

The controller 12 of the terminal 100 sends the contents with the predetermined subticket ID and the access point ID via the interface 140 to the service user's unit 4.

According to the second embodiment, the unit 4 can receive contents only by using the access point terminal 100 installed in the predetermined facility. Thanks to this restriction, an event in which the contents delivery service is illegally used from any place outside the facility can be prevented even without using the user's unit ID.

Also, according to second embodiment, other services can be provided. For example, by installing access point terminals in a plurality of positions in an amusement park, an adventure game can be enjoyed using the overall filed of the park. Specifically, there can be provided a game service as below. The user finds an answer of a quiz sent to his or her service user's unit 4. The user then sends the answer to an access point terminal 100 identified by an access point ID. When the answer is correct, the user receives a next quiz and a next access point terminal 100. By repeating this procedure, the user can successfully arrive at a goal.

Description has been given of the second embodiment.

In the second embodiment, the contents providing side (e.g., the delivery service providing unit 3, the access pointer terminal 100, or the ID control unit 2) may notify, together with an access point ID, a position of an access point terminal 100 having the access point ID to the user by characters or sound and voice.

The access point terminal 100 and the delivery service providing unit 3 may be configured, for example, in one unit (i.e., the terminal 100 may include the function of the unit 3).

The storage 33 of the unit 3 may store a plurality of access point identifiers respectively corresponding to a plurality of access point terminals 100. When an access point ID is received from an access point terminal 100, the delivery service providing unit 3 makes a check to determine whether or not the storage 33 includes an access point ID matching the access point ID received from the terminal 100. If a positive result is obtained, the unit 3 transmits contents to the terminal 100.

The access point terminal 100 and the delivery service providing unit 3 (and the ID control unit 2) may be communicably connected via a leased line to each other.

Next, description will be given of a third embodiment.

According to the third embodiment, at least in the first embodiment or the second embodiment, at least the ticket identifiers or the user's unit identifiers are classified into groups. Identifier group information indicates, for each ticket identifier (and/or a user's unit identifier), a group including the ticket. The ID group information is stored in a predetermined storage on the contents delivery side (e.g., at least the ID control unit 2, the delivery service providing unit 3, or the access point terminal 100).

The unit 3 provides various services according to the ID group information in the storage.

For example, when delivering first contents to a service user's unit 4 having stored a ticket ID and/or a user's unit ID, the delivery service providing unit 3 identifies one or more same-group ticket identifiers and/or one or more same-group user's unit identifiers belonging to the group of the ticket ID and/or the user's unit ID using the ID group information. The unit 3 obtains contents substantially equal to the first contents and/or second contents related to the first contents from the delivery service storage 33 and sends these contents to one or more same-group service user's units 4 respectively storing the same-group ticket IDs and/or the same-group user's unit IDs.

For example, the contents delivery side (e.g., the delivery service providing unit 3) detects a position of each of one or more service user's unit 4 existing in the facility and registers the position to a predetermined storage. At predetermined timing (e.g., periodically or at reception of a predetermined request from a service user's unit 4), the contents delivery side (e.g., the unit 3) transmits to a predetermined service user's unit 4 (e.g., a unit 4 of the request source) detected positions of one or more service user's units 4 belonging to the group of the unit 4. Thanks to this operation, a user having a predetermined service user's unit 4 can recognize, for example, positions of members belonging to the group of the user. In this case, if the ticket ID includes, for example, a ticket ID type, which will be described later, it may also be possible to display the detected positions in various display modes (e.g., in various colors) according to the ticket ID types). For example, it is also possible when the type indicates that the user is an adult, the detected position is displayed in a first color, and when the user is a child, the detected position is displayed in a second color.

The registration of ID group information, that is, the grouping of ticket identifiers and/or user's unit identifiers can be conducted in various methods as below.

(1) First Grouping Method

The access point terminal 100 of the second embodiment receives one or more same-group ticket identifiers and/or one or more same-group user's unit identifiers directly or via a service user's unit 4. The terminal sends the identifiers to the ID control unit 2. The unit 2 assigns an arbitrary group identifier to the ticket identifiers and/or the user's unit identifiers and then registers the identifiers to the ID control database 231 with a correspondence established between the group identifier and the ticket identifiers and/or the user's unit identifiers.

(2) Second Grouping Method

Figure 9:
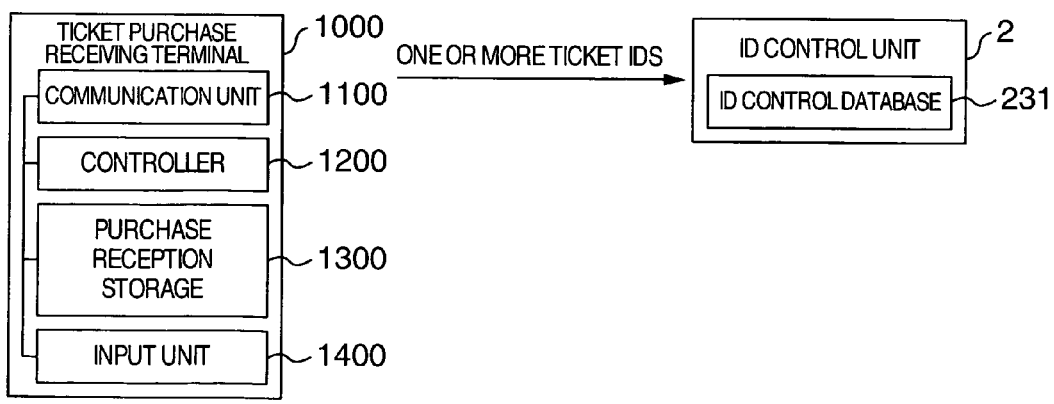
FIG. 9 is a block diagram to explain a second grouping method in a third embodiment according to the present invention.

Referring now to FIG. 9, description will be given of the second grouping method.

A ticket purchase user's terminal 1000 installed in the neighborhood of the predetermined facility or at a position outside the facility carries out the grouping operation. The terminal includes a communication unit 1100, a controller 1200, a purchase storage 1300, and an input unit 1400.

For example, the input unit 1400 receives an input of the number of tickets to be purchased and then registers the number of tickets to the storage 1300.

The controller 1200 issues as many tickets as indicated by the number of tickets registered to the storage 1300 and assigns a ticket identifier to each of the tickets. The controller 1200 sends the assigned ticket identifiers thus assigned to the associated tickets via the communication unit 1100 to the ID control unit 2.

When the ticket identifiers are received, the ID control unit 2 assigns a particular group identifier to the ticket identifiers and registers the ticket identifiers to the ID control database 231 with a correspondence established between the group identifier and the ticket identifiers.

(3) Third Grouping Method

According to an operation by the user, a unit on the service user's side (e.g., a service user's unit 4 or a personal computer or the like installed in the house of the user) accesses a unit on the contents delivery side (e.g., the ID control unit 2 or the delivery service providing unit 3) before the user enters the facility (e.g., on a day immediately before the day on which the user enters the facility) to input one or more ticket identifiers and/or user's unit identifiers to the communicating unit. The ID control unit 2 assigns a particular group identifier to the ticket identifiers and/or the user's unit identifiers and registers these identifiers to the ID control database 231 with a correspondence established between these identifiers and the group identifier. Thanks to the operation, when the user actually enters the facility and the ticket identifier is sent from the entrance and exit control unit 1 to the ID control unit 2, there is produced a group for one or more service user's units existing in the facility.

Description has been given of the third embodiment.

In the third embodiment, it may also be possible that, for example, the service user's unit 4 or the access point terminal 100 receives one or more new ticket identifiers and/or one or more new user's unit identifiers to change the group configuration registered to the ID control table 231.

For example, the group configuration (e.g., a group identifier) of one or more ticket identifiers and/or user's unit identifiers may be also registered to the delivery record database 333 in addition to the ID control database 231. For this purpose, the ID control unit 2 or the service user's unit 4 transmits one or more ticket identifiers and/or user's unit identifiers to the delivery service providing unit 3. The unit 3 assigns a particular group identifier to the ticket identifiers and/or user's unit identifiers and registers these identifiers to the delivery record data base 333 with a correspondence established between the identifiers and the group identifier.

Additionally, for example, to deliver contents to one or more service user's unit 4, the delivery service providing unit 3 inquires a ticket identifier of each of the units 4. When the ticket identifier is received from the unit 4 and the collation of the ticket identifier results in "OK", the unit 3 delivers the contents to the unit 4.

According to the third embodiment, since one or more ticket identifiers are classified into one group, the contents delivery service can be provided in various modes.

Next, description will be given of a fourth embodiment.

In the fourth embodiment, when the service user's unit 4 is a device capable of making a call or of communicating data with an external unit and is in a predetermined facility, the call and/or the data communication become/becomes impossible under control of a computer program read by the controller 42 of the unit 4. In this connection, "the call and/or the data communication become/becomes impossible" is appreciated as below. For the call, either one or both of "to issue a call" and "to receive a call" becomes/become impossible. For the data communication, either one or both of "to send data" and "to receive data" becomes/become impossible. The computer program may be inputted from the entrance and exit control unit 1 or an external unit such as a predetermined web server or may be installed in the service user's unit 4 in advance.

The call and/or the data communication become/becomes impossible, for example, in the following cases.

(1) In a case in which the service user's unit 4 is communicable with the entrance and exit control unit 1 via a short-distance wireless communication system or the like, the situation above occurs when the controller 42 of the unit 4 detects an event of entrance of a user by conducting predetermined communication with the unit 1.

(2) The situation above takes place when a ticket identifier is inputted to the service user's unit 4.

The state in which the call and/or the data communication become/becomes impossible is changed to a state in which the call and/or the data communication become/becomes possible, for example, in the following case.

(A) In a case in which the service user's unit 4 is communicable with the entrance and exit control unit 1 via a short-distance wireless communication system or the like, the state change described above occurs when the controller 42 of the unit 4 detects an event of exit of a user by conducting predetermined communication with the unit 1 (in this case, the controller 42 may erase the associated ticket identifier in the storage 43 of the unit 4).

According to the fourth embodiment, since the call and/or the data communication become/becomes impossible in the facility (e.g., a train), the call or data communication annoying other people will be prevented. Even when the call and/or the data communication become/becomes impossible, there does not occur any considerable trouble for the following reason. Only if the access point terminals 100 are distributed in the facility, operations such as operation to receive contents can be conducted by the terminals 100.

Description has been given of the fourth embodiment. In the fourth embodiment, even when the call and/or the data communication become/becomes impossible, it may also be possible to allow the short-length communication with the access point terminals 100.

Description will now be given of the fifth embodiment.

In the fifth embodiment, the ticket identifier includes a ticket identifier type. The type includes, for example, a ticket attribute (e.g., an expiration time of ticket validity, adult/child, etc.) and/or an attribute of a user of the ticket (e.g., adult/child, sex, birth year, month, and day; and/or address).

A ticket ID type/contents relation table is prepared in the storage of a device on the contents delivery side (e.g., the ID control unit 2 or the delivery service providing unit 3). Contents attributes (e.g., contents identifier information items) corresponding respectively to one or more ticket ID types are registered to the table.

The unit 3 delivers contents according to the ticket ID type included in the ticket ID. For example, even when the collation result of the ticket ID is "OK", if there does not exist any correspondence between the attributes of the desired contents and the ticket ID type of the ticket ID, the unit 3 does not deliver the contents. Or, the unit 3 delivers contents which are related to the desired contents and which has an attribute corresponding to the ticket ID type. When a request for contents indicating counters to sell alcohol is received and it is recognized according to the ticket ID type that the user is minor-aged, the unit 3 delivers contents indicating counters to sell drinks other than alcohol.

Description has been given of the fifth embodiment.

In the fifth embodiment, for example, a ticket identifier which includes a ticket ID type and which the service user's unit 4 can store therein to transmit therefrom may be updated (e.g., changed, added, or deleted), according to necessity. Specifically, for example, it is also possible that when the user inserts or places the ticket 7 in or over the entrance and exit control unit 1 to make the unit 1 communicate with the ticket in a contacting or contactless way, the terminal 100 updates the ticket ID assigned to the ticket. It is also possible, for example, that when the user makes the service user's unit 4 communicate with the access point terminal 100, a particular ticket identifier is updated in the storage 43 of the unit 4. By appropriately changing the ticket identifier in the facility, the services which the user receives in the facility can be changed.

According to the fifth embodiment, digital contents are delivered according to the ticket ID type of the ticket identifier. Therefore, the contents delivery service can be provided in various modes.

An example using a grouping method has been described in conjunction with the third embodiment. In this regard, the grouping may be conducted to obtain positional information of each user possessing a service user's unit. Specifically, by using the global positioning system (GPS) or the like, positional information of a unit having a ticket ID or a unit ID grouped as above is presented on a displayed of the unit. In this configuration, it is easy to search for a missing child in a group activity and/or attractions can be enjoyed using a display for each group. To guarantee protection of privacy, it is also possible to prevent the positional information from being displayed after the user exits the facility.

Also, it is possible that a plurality of unit identifiers are related to one ticket identifier or a plurality of ticket identifiers are related to one unit identifier. By relating one ticket identifier to a plurality of unit identifiers, it is possible to implement, for example, family reduction. By relating one unit identifier to a plurality of ticket identifiers, it is possible to relate different services to each other even when there are obtained, for example, ticket identifiers of different services.

There may be employed a configuration in which when a service user's unit enters a predetermined area (e.g., a predetermined facility or a particular area of the facility), an entrance and exit control unit installed in the particular area communicates with the service user's unit such that the unit automatically turns its communication function and its mail function off or sets these constituent components to a manner mode to receive a ticket identifier. This guarantees implementation of the manner-mode operation. By turning the communication function and the mail function off, the manner-mode operation is conducted for a person using, for example, a pacemaker. This provides a service having high public morality. It is hence possible to implement services in a hospital or the like.

There may also be constructed a configuration in which only when the user passes a gate, the exit processing is automatically executed. In this case, it is not required for the user to manually conduct the exit processing. Without any troublesome operation, the user can execute the exit processing. For the side to control the ticket identifier and the unit identifier, this also makes it easier to conduct the control operation.

While the present invention has been described with reference to several illustrative embodiments, it is not to be restricted by those embodiments but only by the appended claims. The present invention can be embodied in other various modes.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A service providing system, comprising:
   entrance detecting means for inputting a ticket identifier assigned to a ticket of a user having entered a predetermined area and for transmitting a ticket identifier therefrom;
   exit detecting means for inputting a ticket identifier of the user who is exiting the predetermined area and for transmitting the ticket identifier therefrom;
   identifier control means including identifier storage means for receiving the ticket identifier transmitted from the entrance detecting means and registering a validity of the ticket identifier to the identifier storage means, and for receiving the ticket identifier transmitted from the exit detecting means and erasing a validity of the ticket identifier from the identifier storage means;
   request receiving means for receiving, from a user's unit having stored a ticket identifier and a user's unit identifier and at any user-selected timing, an identifier set of the ticket identifier and the user's unit identifier and a contents request, the user's unit being associated with the user respectively having a ticket whose identifier has been registered in the identifier storage means;
   identifier collating means for making a check in response to the contents request thus received at the request receiving means, to determine whether or not an identifier set matching the identifier set thus received exists in the identifier storage means, and outputting a result of the check; and
   contents delivery means for delivering, if the result of check is positive, predetermined digital contents or digital contents desired by the user and identified by the contents request to the user's unit, the delivering being operable only within the predetermined area.

2. A service providing system according to claim 1, wherein the identifier collating means registers, when a matching ticket identifier matching the ticket identifier thus received exists in the identifier storage means and a user's unit identifier matching the matching ticket identifier does not exits in the identifier storage means, the user's unit identifier of the identifier set thus received to the identifier storage means with a correspondence established between the matching ticket identifier and the user's unit identifier, and outputs a check result indicating a positive result therefrom.

3. A service providing system according to claim 1, wherein:
   the identifier storage means includes one or more identifier set groups registered thereto, each of the ID set group including one or more ticket identifiers and/or user's unit identifiers; and
   the contents delivery means delivers digital contents according to the ID set group.

4. A service providing system according to claim 3, further comprising:
   identifier receiving means for receiving one or more ticket identifiers and/or one or more user's unit identifiers from at least either one of an access point terminal distributed in the predetermined area, the service user's unit, another information processing terminal which the user can utilize, and the ticket purchase receiving terminal issuing the ticket to which the ticket identifier is assigned; and
   grouping means for registering group information regarding a group including the ticket identifiers and/or the user's unit identifiers received as above to the identifier storage means.

5. A service providing system according to claim 1, further including communication disable control means for setting the user's unit, in a case in which the user's unit is capable of communicating a call and/or data with an external unit, to a state in which the user's unit cannot conduct the call and/or the data communication, at predetermined timing after the user enters the predetermined area.

6. A service providing system according to claim 1, wherein the delivering being operable at any user-selected timing within a service-providing period defined between registering the validity and erasing the validity of the ticket identifier to the identifier storage means.

7. A service providing system, comprising:
   entrance detecting means for inputting a ticket identifier assigned to a ticket of a user having entered a predetermined area and transmitting the ticket identifier therefrom;
   exit detecting means for inputting the ticket identifier of the user who is exiting the predetermined area and for transmitting the ticket identifier therefrom;
   identifier control means for receiving the ticket identifier transmitted from the entrance detecting means and registering a validity of the ticket identifier to identifier storage means, and for receiving the ticket identifier transmitted from the exit detecting means and erasing a validity of the ticket identifier from the identifier storage means;
   a plurality of access point terminals distributed in the predetermined area;
   request receiving means for receiving, via a first one of the access point terminals from a user's unit having received and stored a ticket identifier and at any user-selected timing, the ticket identifier and a contents request;
   identifier collating means for making a check in response to the contents request thus received, to determine whether or not a ticket identifier matching the ticket identifier thus received exists in the identifier storage means, and outputting a result of the check; and
   contents delivery means for delivering, if the result of check is positive, predetermined digital contents or digital contents desired by the user and identified by the contents request via the first access point terminal to the user's unit, the delivering being operable only within the predetermined area.

8. A service providing system, comprising:
   entrance detecting means for inputting a ticket identifier assigned to a ticket of a user having entered a predetermined area and transmitting the ticket identifier therefrom;
   exit detecting means for inputting the ticket identifier of the user who is exiting the predetermined area and for transmitting the ticket identifier therefrom;
   identifier control means for receiving the ticket identifier transmitted from the entrance detecting means and registering a validity of the ticket identifier to identifier storage means, and for receiving the ticket identifier transmitted from the exit detecting means and erasing a validity of the ticket identifier from the identifier storage means;
   identifier receiving means for receiving one or more ticket identifiers from at least either one of an access point terminal distributed in the predetermined area, a service user's unit, another information processing terminal which the user can utilize, and a ticket purchase receiving terminal issuing the ticket to which the ticket identifier is assigned;

grouping means for registering group information regarding a group including the ticket identifiers received as above to the identifier storage means;

request receiving means for receiving, from the service user's unit having received and stored a ticket identifier and at any user-selected timing, the ticket identifier and a contents request;

identifier collating means for making a check in response to the contents request thus received, to determine whether or not a ticket identifier matching the ticket identifier thus received exists in the identifier storage means, and outputting a result of the check; and contents delivery means for delivering, if the result of check is positive, predetermined digital contents or digital contents desired by the user and identified by the contents request via the first access point terminal to the user's unit, according to the group information, the delivering being operable only within the predetermined area.

9. A service providing system, comprising:

entrance detecting means for inputting a ticket identifier assigned to a ticket of a user having entered a predetermined area and for transmitting the ticket identifier therefrom;

exit detecting means for inputting the ticket identifier of the user who is exiting the predetermined area and for transmitting the ticket identifier therefrom;

identifier control means for receiving the ticket identifier transmitted from the entrance detecting means and registering a validity of the ticket identifier to identifier storage means, and for receiving the ticket identifier transmitted from the exit detecting means and erasing a validity of the ticket identifier from the identifier storage means;

request receiving means for receiving, from a user's unit having received and stored a ticket identifier and at any user-selected timing, the ticket identifier and a contents request;

identifier collating means for making a check in response to the contents request thus received, to determine whether or not a ticket identifier matching the ticket identifier thus received exists in the identifier storage means, and outputting a result of the check; and contents delivery means for delivering, if the result of check is positive, predetermined digital contents or digital contents desired by the user and identified by the contents request via the first access point terminal to the user's unit, the delivering being operable only within the predetermined area, wherein:

the ticket identifier includes a ticket identifier type including an attribute of the ticket and/or an attribute regarding the user possessing the ticket; and the contents delivery means delivers digital contents according to the ticket identifier type to the user's unit.

10. A service providing method of comprising:

inputting a ticket identifier assigned to a ticket of a user having entered a predetermined area and transmitting the ticket identifier therefrom;

inputting the ticket identifier of the user who is exiting the predetermined area and transmitting the ticket identifier therefrom;

receiving the ticket identifier transmitted from the entrance detecting means at the entrance and registering a validity of the ticket identifier to identifier storage means;

receiving the ticket identifier transmitted from the exit detecting means at the exit and erasing a validity of the ticket identifier from the identifier storage means;

receiving, from a user's unit having stored a ticket identifier and a user's unit identifier and at any user-selected timing, an identifier set of the ticket identifier and the user's unit identifier and a contents request;

making a check in response to the contents request received in the preceding step, to determine whether or not an identifier set matching the identifier set received in the preceding step exists in the identifier storage means, and outputting a result of the check; and delivering, if the result of check is positive, predetermined digital contents or digital contents desired by the user and identified by the contents request to the user's unit, the delivering being operable only within the predetermined area.

11. A service providing method comprising:

inputting a ticket identifier assigned to a ticket of a user having entered a predetermined area and transmitting the ticket identifier therefrom;

inputting the ticket identifier of the user who is exiting the predetermined area and transmitting the ticket identifier therefrom;

receiving the ticket identifier transmitted from the entrance detecting means and registering a validity of the ticket identifier to identifier storage means;

receiving the ticket identifier transmitted from the exit detecting means and erasing a validity of the ticket identifier from the identifier storage means;

receiving, via a first one of a plurality of access point terminals distributed in the predetermined area from a user's unit having received and stored a ticket identifier and at any user-selected timing, the ticket identifier and a contents request;

making a check in response to the contents request received in the preceding step, to determine whether or not a ticket identifier matching the ticket identifier received in the preceding step exists in the identifier storage means, and outputting a result of the check; and delivering, if the result of check is positive, predetermined digital contents or digital contents desired by the user and identified by the contents request via the first access point terminal to the user's unit, the delivering being operable only within the predetermined area.

12. A service providing method according to claim 11, wherein the delivering being operable at any user-selected timing within a service-providing period defined between registering the validity and erasing the validity of the ticket identifier to the identifier storage means.

13. A service providing method, comprising:

inputting a ticket identifier assigned to a ticket of a user having entered a predetermined area and transmitting the ticket identifier therefrom;

inputting the ticket identifier of the user who is exiting the predetermined area and transmitting the ticket identifier therefrom;

receiving the ticket identifier transmitted from the entrance detecting means and registering a validity of the ticket identifier to identifier storage means;

receiving the ticket identifier transmitted from the exit detecting means and erasing a validity of the ticket identifier from the identifier storage means;

receiving one or more ticket identifiers from at least either one of an access point terminal distributed in the predetermined area, a service user's unit, another information processing terminal which the user can utilize, and a ticket purchase receiving terminal issuing the ticket to which the ticket identifier is assigned; and registering group information regarding a group including the ticket identifiers received as above to the identifier storage means;

receiving, from the service user's unit having received and stored a ticket identifier and at any user-selected timing, the ticket identifier and a contents request;

making a check in response to the contents request received in the preceding step, to determine whether or not a ticket identifier matching the ticket identifier received in the preceding step exists in the identifier storage means, and outputting a result of the check; and delivering, if the result of check is positive, predetermined digital contents or digital contents desired by the user and identified by the contents request via the first access point terminal to the user's unit, according to the group information, the delivering being operable only within the predetermined area.

14. A service providing method, comprising:

inputting a ticket identifier assigned to a ticket of a user having entered a predetermined area and transmitting the ticket identifier therefrom;

inputting the ticket identifier of the user who is exiting the predetermined area and transmitting the ticket identifier therefrom;

receiving the ticket identifier transmitted from the entrance detecting means and registering a validity of the ticket identifier to identifier storage means;

receiving the ticket identifier transmitted from the exit detecting means and erasing a validity of the ticket identifier from the identifier storage means;

receiving, from a user's unit having received and stored a ticket identifier and at any user-selected timing, the ticket identifier and a contents request;

making a check in response to the contents request received in the preceding step, to determine whether or not a ticket identifier matching the ticket identifier received in the preceding step exists in the identifier storage means, and outputting a result of the check; and delivering, if the result of check is positive, predetermined digital contents or digital contents desired by the user and identified by the contents request via the first access point terminal to the user's unit, the delivering being operable only within the predetermined area, wherein:

the ticket identifier includes a ticket identifier type including an attribute of the ticket and/or an attribute regarding the user possessing the ticket; and the contents delivery means delivers digital contents according to the ticket identifier type to the user's unit.

15. A service providing system, comprising:

entrance detecting means for inputting a first ticket identifier assigned to a ticket of a user having entered a predetermined area and for transmitting the first ticket identifier therefrom;

exit detecting means for inputting a second ticket identifier of the user who is exiting the predetermined area and for transmitting the second ticket identifier therefrom;

identifier control means including identifier storage means for receiving the first ticket identifier transmitted from the entrance detecting means and registering a validity of the first ticket identifier to the identifier storage means, and for receiving the second ticket identifier transmitted from the exit detecting means and erasing a validity of the first ticket identifier from the identifier storage means if the first ticket identifier matches the second ticket identifier;

request receiving means for receiving, from a user's unit having stored the first ticket identifier and a user's unit identifier and at any user-selected timing, an identifier set of the ticket identifier and the user's unit identifier and a contents request;

identifier collating means for making a check in response to the contents request thus received, to judge whether or not an identifier set matching the identifier set thus received exists in the identifier storage means, and outputting a result of the check; and contents delivery means for delivering, if the result of check is positive, predetermined digital contents according to both the user and the contents request to the user's unit, the delivering being operable only within the predetermined area.

* * * * *